United States Patent
Alaarif

(10) Patent No.: US 11,412,382 B2
(45) Date of Patent: Aug. 9, 2022

(54) MOBILE APPLICATION CAMERA ACTIVATION AND DE-ACTIVATION BASED ON PHYSICAL OBJECT LOCATION

(71) Applicant: Humans, Inc, Inglewood, CA (US)

(72) Inventor: Nooruldeen A Arif Alaarif, Los Angeles, CA (US)

(73) Assignee: Humans, Inc, Inglewood, CA (US)

( * ) Notice: Subject to any disclaimer, the term of this patent is extended or adjusted under 35 U.S.C. 154(b) by 417 days.

(21) Appl. No.: 16/742,667

(22) Filed: Jan. 14, 2020

(65) Prior Publication Data

US 2021/0144552 A1 May 13, 2021

Related U.S. Application Data

(60) Provisional application No. 62/932,117, filed on Nov. 7, 2019.

(51) Int. Cl.
*H04W 12/08* (2021.01)
*G06F 21/55* (2013.01)
(Continued)

(52) U.S. Cl.
CPC ............ *H04W 12/08* (2013.01); *G06F 21/34* (2013.01); *G06F 21/554* (2013.01);
(Continued)

(58) Field of Classification Search
CPC ....... H04W 4/029; H04W 4/21; H04W 12/08; G06F 21/554; G06F 21/34; G06F 3/0482;
(Continued)

(56) References Cited

U.S. PATENT DOCUMENTS

| | | | | |
|---|---|---|---|---|
| 10,679,198 | B2* | 6/2020 | Schueller | G06Q 30/06 |
| 2013/0147970 | A1* | 6/2013 | Herring | G06Q 30/0601 |
| | | | | 348/207.1 |
| 2014/0007183 | A1* | 1/2014 | Qureshi | H04W 12/06 |
| | | | | 726/1 |
| 2014/0046837 | A1* | 2/2014 | Metral | G06Q 40/02 |
| | | | | 705/41 |

(Continued)

FOREIGN PATENT DOCUMENTS

| | | |
|---|---|---|
| KR | 10-2011-0065950 A | 6/2011 |
| KR | 10-2016-0037139 A | 4/2016 |

(Continued)

OTHER PUBLICATIONS

PCT International Search Report and Written Opinion, PCT Application No. PCT/IB2020/060487, Jan. 29, 2021, nine pages.

*Primary Examiner* — Jean A Gelin
(74) *Attorney, Agent, or Firm* — Fenwick & West LLP

(57) ABSTRACT

A system and a method are disclosed for selectively activating access by an application to a camera. In an embodiment, a physical object provider receives a request, from an application installed on a mobile device of a user, for a physical object to be delivered to an address corresponding to the user, wherein access by the application to a camera of the mobile device is de-activated. Responsive to receiving the request, the physical object is caused to be delivered to the address. The physical object provider receives a notification that the physical object has been delivered to the address, and transmits an instruction to the application to activate access by the application to the camera. The physical object provider receives, from the application, an image captured by the camera, and publishes the image to an additional user.

20 Claims, 7 Drawing Sheets

(51) Int. Cl.
| | |
|---|---|
| *G06F 21/34* | (2013.01) |
| *G06Q 10/08* | (2012.01) |
| *G06Q 30/00* | (2012.01) |
| *H04W 4/21* | (2018.01) |
| *H04N 7/18* | (2006.01) |
| *H04W 4/029* | (2018.01) |
| *H04L 67/55* | (2022.01) |
| *G06F 3/0482* | (2013.01) |
| *H04L 67/306* | (2022.01) |
| *H04L 67/141* | (2022.01) |

(52) U.S. Cl.
CPC ..... *G06Q 10/0835* (2013.01); *G06Q 10/0838* (2013.01); *G06Q 30/0185* (2013.01); *H04N 7/183* (2013.01); *H04W 4/029* (2018.02); *H04W 4/21* (2018.02); *G06F 3/0482* (2013.01); *G06F 2221/034* (2013.01); *H04L 67/141* (2013.01); *H04L 67/26* (2013.01); *H04L 67/306* (2013.01)

(58) Field of Classification Search
CPC .......... G06Q 10/0838; G06Q 10/0835; G06Q 30/0185; H04N 7/183
See application file for complete search history.

(56) References Cited

U.S. PATENT DOCUMENTS

| | | | | |
|---|---|---|---|---|
| 2014/0358666 | A1* | 12/2014 | Baghaie | G06Q 30/0261 705/14.58 |
| 2015/0127430 | A1* | 5/2015 | Hammer, III | G06Q 30/0206 705/7.35 |
| 2015/0302011 | A1* | 10/2015 | Ochiai | G06Q 30/0643 705/26.61 |
| 2017/0091850 | A1* | 3/2017 | Alvarez | H04B 5/0062 |
| 2018/0041686 | A1* | 2/2018 | Bostick | H04N 5/23225 |
| 2018/0125278 | A1 | 5/2018 | Jiang | |
| 2018/0270631 | A1* | 9/2018 | High | G06K 7/10405 |
| 2018/0343231 | A1* | 11/2018 | Terajima | H04L 61/2046 |
| 2019/0102873 | A1* | 4/2019 | Wang | G06K 9/6268 |
| 2019/0205827 | A1* | 7/2019 | Yamaguchi | G06Q 30/06 |
| 2019/0310837 | A1* | 10/2019 | Zmijewski | G06F 16/986 |
| 2019/0355121 | A1* | 11/2019 | Nelson | G01B 11/022 |
| 2020/0050439 | A1* | 2/2020 | Bjørdal | G06F 8/61 |
| 2020/0193538 | A1* | 6/2020 | Kam | G06Q 50/16 |
| 2020/0403992 | A1* | 12/2020 | Huffman | G06F 21/6245 |
| 2021/0004137 | A1* | 1/2021 | Oser | G06F 3/04815 |

FOREIGN PATENT DOCUMENTS

| | | |
|---|---|---|
| KR | 10-2016-0131695 A | 11/2016 |
| KR | 10-2019-0097365 A | 8/2019 |

\* cited by examiner

600

650

MOBILE APPLICATION CAMERA ACTIVATION AND DE-ACTIVATION BASED ON PHYSICAL OBJECT LOCATION

CROSS REFERENCE TO RELATED APPLICATIONS

This application claims the benefit of U.S. Provisional Application No. 62/932,117, filed Nov. 7, 2019, the disclosure of which is hereby incorporated by reference herein in its entirety.

TECHNICAL FIELD

The disclosure generally relates to the field of data integrity, and more particularly relates to ensuring integrity of image data by restricting access to a camera feature of a mobile device application unless a physical object on which data is being collected is at a predetermined physical location.

BACKGROUND

Online applications that include camera features enable users to capture images and then annotate those images with metadata without restraint. While this may be helpful for some types of applications, such as social media applications that may harvest annotations, as well as other metadata and other features from the images to improve a graph, this may be detrimental for the accurate tracking of data rooted in tangible real-world objects.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a mechanism for selectively activating access by an application to a camera of a mobile device. For example, an application might be used to capture images of users wearing various trial clothing to solicit feedback from other users about whether the clothing looks good on them. Data may be captured by the application based on how users respond to the image. The data might be compromised if the image does not accurately display the clothing it allegedly contains, be it due to user error (e.g., image is of a poor angle or in poor lighting), or due to fraudulent use (image is of different clothing, includes lewd imagery, and the like). To prevent the data from being compromised, the systems and methods disclosed herein prevent access by the application to the camera unless physical objects that are to be featured in the images are actually in possession of the user. Further verifications may be performed to ensure that the images actually represent what they are purported to represent.

To this end and others, in an embodiment, a physical object provider receives a request, from an application installed on a mobile device of a user, for a physical object to be delivered to an address corresponding to the user, wherein access by the application to a camera of the mobile device is de-activated. Responsive to receiving the request, the physical object is caused to be delivered to the address. The physical object provider receives a notification that the physical object has been delivered to the address, and transmits an instruction to the application to activate access by the application to the camera. The physical object provider receives, from the application, an image captured by the camera, and publishes the image to an additional user.

Selective Activation and De-Activation of a Camera Function of an Application

Figure 1:
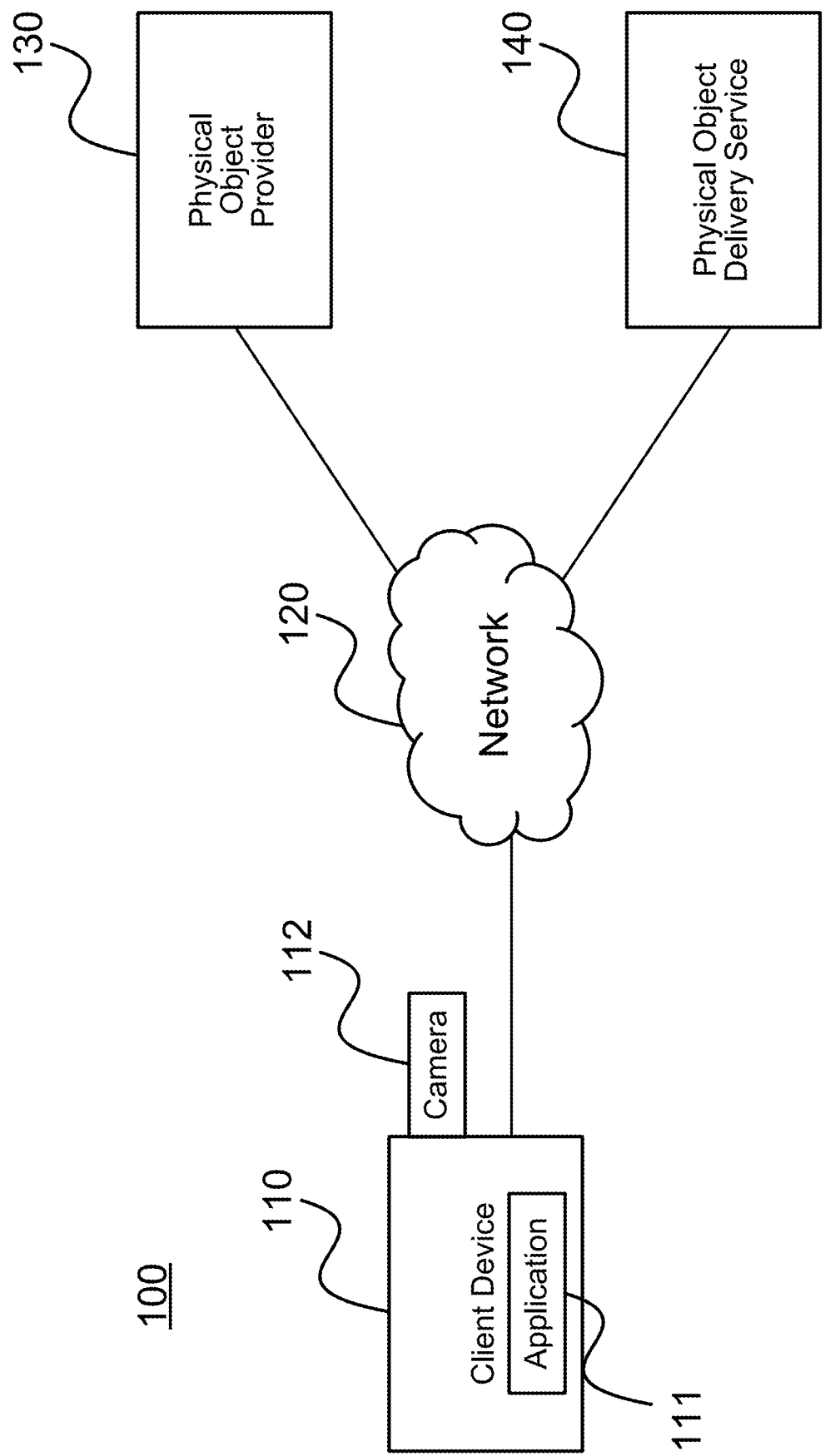
FIG. 1 illustrates one embodiment of a system embodiment including an application of a client device that toggles activation of a camera function based on location of a physical object.

FIG. 1 illustrates one embodiment of a system embodiment including an application of a client device that toggles activation of a camera based on location of a physical object. System 100 includes client device 110, network 120, physical object provider 130, and physical object delivery service 140. Client device 111 may be any device facing an end user. Examples of client devices include mobile devices like smart phones and tablet computers, laptops, personal computers, smartwatches, internet-of-things (IoT) devices, and any other device with, or capable of being coupled to, a display with which the user can interact to cause data to be transmitted over a network. Network 120 may be any data network, such as the Internet or any other network that facilitates data communication between client device 111 and a server.

Client device 110 includes application 111 and camera 112. Application 111 may be downloaded from physical object provider 130. In brief, application 111 enables a user of client device 110 to browse images of physical objects and annotate the browsed images. For example, if the physical objects include clothing, application 111 might display images of the clothing, and the user might indicate whether he or she likes or dislikes the clothing. Further details about application 111 will be described below with respect to FIG. 2.

Physical object provider 130 is a service that facilitates the browsing, selection, and provision of physical objects. Physical object provider 130 transmits images of physical objects to application 111 for browsing by the user of client device 110, and logs user interactions with those images. Physical object provider 130 may receive a request to provide physical objects to an address of a user of client device 110, and may responsively select physical objects and coordinate delivery of those physical objects via physical object delivery service 140. Further details about physical object provider 130 are described below with respect to FIG. 3.

Physical object delivery service 140 is a service that delivers physical objects from a source location (e.g., a warehouse associated with physical object provider 130) to a destination location (e.g., the address of the user of client device 111), and that returns some or all of the physical objects from the destination location to the source location. While only one client device, physical object provider, and physical object delivery service are depicted, this is for convenience in illustration; any number of any of these components is within the scope of the disclosure. The components of physical object provider 130 may be distributed over one or more servers. Physical object delivery service 140 may be a third-party parcel delivery service operated separately from physical object provider 130.

Figure 2:
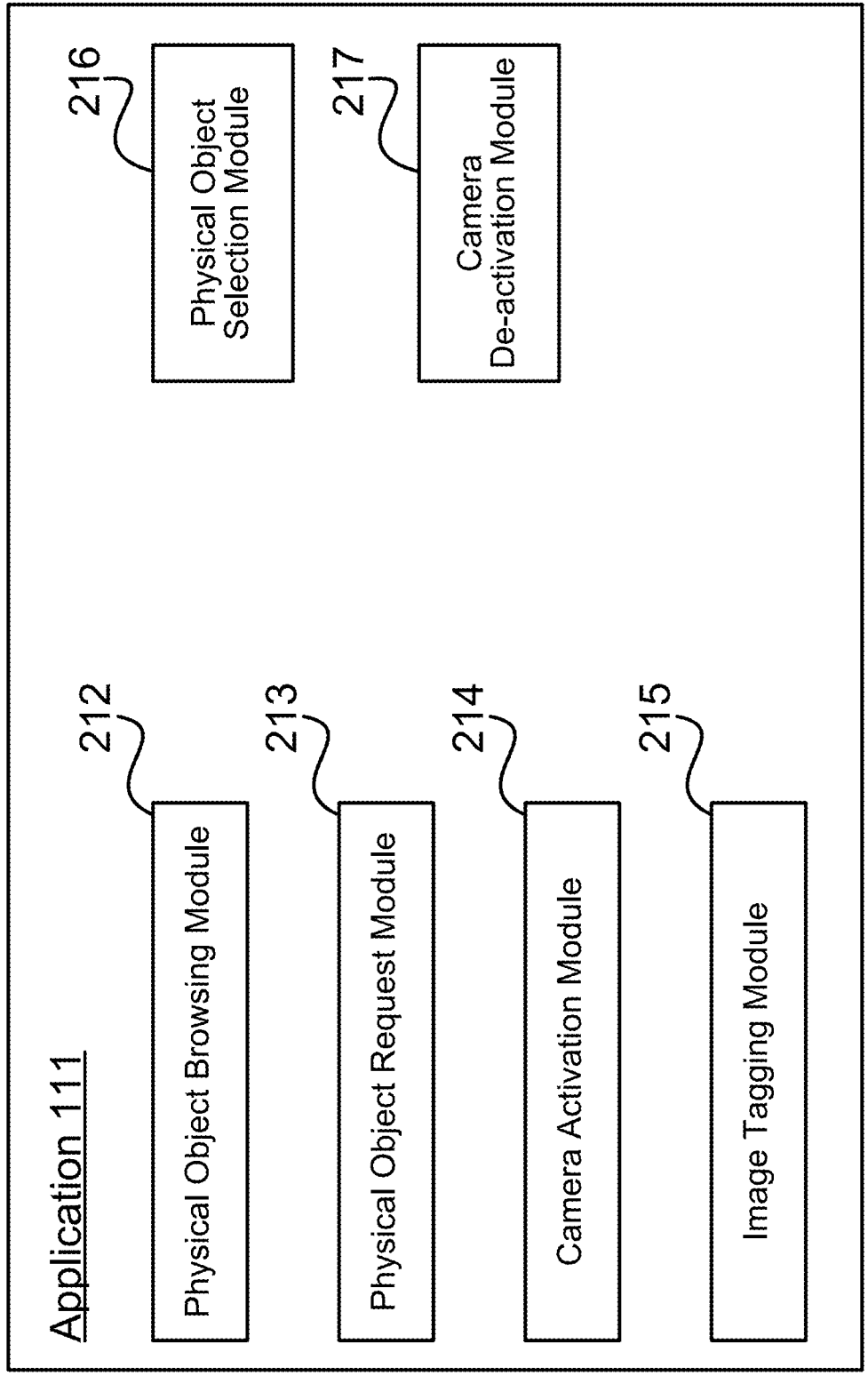
FIG. 2 illustrates one embodiment of exemplary modules of the application.

FIG. 2 illustrates one embodiment of exemplary modules of the application. Application 111 includes physical object browsing module 212, physical object request module 213, camera activation module 214, image tagging module 215, physical object selection module 216, and camera de-activation module 217. The modules depicted in FIG. 2 are merely exemplary; fewer or more modules may be included to execute the functions described with respect to application 111.

Application 111 will now be described where the physical objects referred to herein are clothing. While this example will be pervasive throughout the remainder of the disclosure, any other tangible, physical object may be used in place of clothing wherever mentioned. Application 111 may be initialized by requesting various biographical information about the user of client device 110 to set up an account for that user. The biographical information may be any information that is descriptive of the user, such as age, sex, weight, sizing (e.g., waist, bust, height, length, etc.), race, ethnicity, and so on. Application 111 may also be initialized by additional information, such as location of residence. Information obtained during initialization may be transmitted by application 111 to physical object provider 130, which may store the information in a profile for the user.

Physical object browsing module 212 outputs images for display on client device 111. The images may be images of various clothing available from physical object provider 130, as they are worn by various individuals. In an embodiment, physical object browsing module 212 limits the images shown to those of users wearing the clothing who are connected to the user of client device 110 by way of a social graph. The social graph will be described in further detail below with respect to FIG. 3. Physical object browsing module 212 detects interactions of the user with the images, such as the indicia that the user likes or dislikes the image. Physical object browsing module 212 transmits this interaction information to physical object provider 130, which may store the interaction information in a profile for the user.

Physical object request module 213 outputs an interface to the user whereby the user may request that physical objects, such as clothing, be delivered to the user. Responsive to receiving a request, physical object request module 213 transmits a request to physical object provider 130 to select physical objects (e.g., clothing based on images of clothing that the user indicated he or she liked) be mailed to an address indicated in the profile of the user. The manner in which the physical objects are selected is described with reference to the physical object selection module 332 depicted in FIG. 3 below.

While application 111 has a built-in function to launch camera 112 and cause images from camera 112 to be uploaded to physical object provider 130, this function is disabled until camera activation module 214 enables the function. Camera activation module 214 awaits a signal from physical object provider 130 that the camera should be activated. The basis on which camera activation module 214 enables activation of the camera function of application 111 is described in further detail with respect to FIG. 3.

After the camera is activated, the application 111 captures images using camera 112 of client device 110. When an image is captured, image tagging module 215 prompts the user to indicate which object, of the physical objects mailed to the user, is within the image. The prompt may include a list of all of the objects that were mailed to the user, from which the user may select an identifier of the object depicted in the figure. In an embodiment, verification of the selection by the user is performed, whereby a model, such as a pattern recognition or machine learning model takes the image and the identifier selected by the user and outputs a result of whether the image and the identifier match. This verification may be performed by application 111 before upload, or by physical object provider 130.

In an embodiment, rather than image tagging module 215 having the user select which of the physical objects mailed to the user is within the image, image tagging module 215 feeds as input the image and a list of objects mailed to the user to a machine learning model, and receives as output indicia of which of the list of objects is within the image, and automatically tags the image with that output. The machine learning model may detect that none of the objects in the list match the image. Where a verification process based on manual selection yields no match, or where an attempt at automatic tagging fails, image tagging module 215 may take corrective action.

Corrective action may include image tagging module 215 instructing that the user be prompted with a notification that the image does not match any objects that were mailed to the user, and requesting a new image be captured. Image tagging module 215 may detect a reason why the image did not match (e.g., low brightness, poor angle of capture, etc.), and may output the reason to the user to inform an adjustment for obtaining an acceptable image. Image tagging module 215 may determine the reason by inputting the image into a machine learning model trained to determine a reason why an image may be unacceptable, and may receive the reason as output (or a probability that each of candidate reasons apply as output, in which case the probabilities may be compared to a threshold and a candidate reason having a probability exceeding the threshold may be selected).

Image tagging module 215 may detect during a verification process or during an attempt at automatic tagging that the user is engaged in fraudulent behavior. This detection may be performed by inputting the image into a model (e.g., a pattern matching model or a machine learning model), which is trained to output whether the image likely corresponds to fraudulent behavior. For example, the model may be trained to detect patterns corresponding to lewd photographs, unauthorized advertisements, and the like. Responsive to detecting fraudulent behavior, image tagging module 215 may transmit an alert to an administrator of physical object provider 130, or may automatically disable application 111 at the client device 110 due to fraudulent behavior.

After tagging the images, the images may be transmitted to other client devices 111 where other users of the physical object provider may be prompted by physical object browsing module 212 to indicate whether they like the images that the user uploaded. Following from the clothing example, the user may use this service to obtain feedback as to whether the clothing looks good on the user. Application 111 may enable the user to designate permissions on who can and cannot provide feedback (e.g., only friends connected to me in the social graph can see these images). Application 111 may enable the user to specifically request particular people provide feedback, which may in turn cause, on those users' applications, a push notification to populate that requests those users provide such feedback.

Camera 112 may remain active after tagging the images, thus enabling the user to upload, tag, and share additional images as desired. For example, the user may receive feedback stating "Looks good from the front! But maybe not the back, can you take a picture at another angle?" Where other users specifically request an additional image be uploaded, physical object provider 130 may instruct application 111 of those other users with a notification, such as a push notification, that the requested additional image has been uploaded.

Physical object selection module 216 may prompt the user to indicate which of the physical objects the user wishes to keep, and which of the physical objects the user wishes to return to physical object provider 130. The user indicates which objects he or she will keep or return and selects a selectable option provided by physical object selection module 216. Physical object selection module 216 may perform this prompt responsive to detecting that feedback has been received and/or responsive to detecting that a predetermined amount of time has elapsed.

Camera de-activation module 217 detects the selection of the selectable option to finalize the selections of what will be kept or returned. Responsively, camera de-activation module 217 de-activates access by application 111 to camera 112. Camera de-activation module 217 may de-activate access by application 111 to camera 112 for other reasons. For example, camera de-activation module 217 may detect that a predetermined amount of time has elapsed since camera 112 was activated, and may responsively de-activate access by application 111 to camera 112. This may occur, for example, where a user is delinquent in trying on and capturing images of clothing mailed to the user. As another example of a de-activation reason, camera de-activation module 217 may receive instructions based on detection that one or more of the physical objects sent to the user have been shipped back to physical object provider 130 (e.g., using delivery confirmation module 334, as described below), and may responsively de-activate access by application 111 to camera 112.

Figure 3:
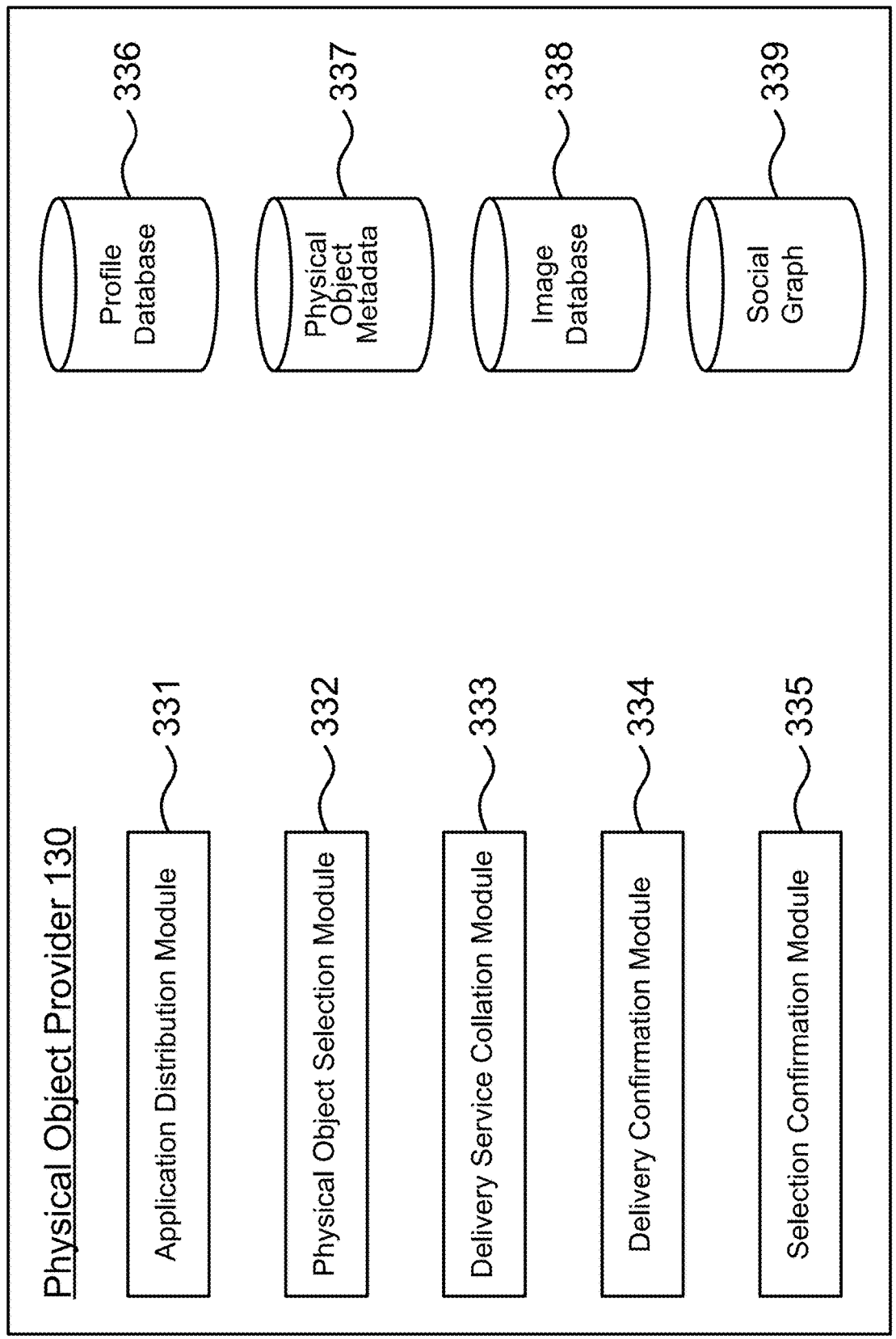
FIG. 3 illustrates one embodiment of exemplary modules of a physical object provider.

FIG. 3 illustrates one embodiment of exemplary modules of a physical object provider. As depicted in FIG. 3, physical object provider 130 includes application distribution module 331, physical object selection module 332, delivery service collation module 333, delivery confirmation module 334, selection confirmation module 335, profile database 336, physical object metadata database 337, image database 338, and social graph 339. The modules and databases of physical object provider 130 are merely exemplary; more or fewer modules and databases may be implemented by physical object provider 130 to effectuate the operations described herein.

Application distribution module 331 transmits an application for download to client device 110. Application distribution module 331 may additionally transmit updates, notifications, and the like, for the application to client devices on which the application is installed. Physical object selection module 332 selects objects to provide to the user upon receiving a request for objects (e.g., from physical object request module 213 of application 111). Physical object selection module 332 selects objects for the user based on the biographical information of the user, as well as the interaction information that the user had while browsing images, all of which may be stored to a user profile in profile database 336. Physical object selection module 332 uses heuristics and/or machine learning models to match the user profile information to physical objects (e.g., clothing that a user is likely to enjoy in a variety of styles). The selected objects are packaged and transferred to physical object delivery service 140, which mails the physical objects to the user at an address indicated in the profile of the user.

Delivery service collation module 333 determines whether the selected physical objects have arrived at the address of the requesting user. In an embodiment, delivery service collation module 333 performs this determination by receiving a notification from physical object delivery service 140 that the object has been delivered (e.g., which may occur automatically when a symbol, such as a bar code, is scanned by the delivery service). This notification may be received by way of a dedicated application programming interface (API) that facilitates communication between physical object provider 130 and physical object delivery service 140. Delivery confirmation module 334 determines, based on output from delivery service collation module 333, that the requested objects have reached the address of the user, and transmits an instruction to application 111 to execute camera activation module 214.

Selection confirmation module 335 receives the selections of what the user has chosen to keep, and what the user has chosen to return to physical object provider 130. Selection confirmation module 335 may, responsive to receiving the selections, instruct application 111 to execute camera de-activation module 217. Instructions to execute de-activation module 217 may be sent to application 111 for other reasons as well. For example, physical object provider 130 may determine that a predetermined amount of time has elapsed since a time of delivery, and may responsively instruct application 111 to execute de-activation module 217. Other reasons for such instruction may include detection of fraudulent behavior, failure to pay for prior selected items, and the like.

Profile database 336 stores profile information about users, such as biographical information, interaction information, and the like, as described above with respect to FIGS. 1-2.

Physical object metadata database 337 stores information received with respect to a physical object. The information may be aggregated preference information received from various users while browsing the images of the physical objects, and may include attributes of the users who provided the preference information. For example, physical object metadata database 237 may store information indicating whether users in a particular part of the world like or dislike an image. Information in physical object metadata database 337 may be used to train machine learning models that are used to recommend certain physical objects to users. While not depicted, an administrator of physical object selection module may execute a module of physical object provider 130 to output a map of some or all of the world, with an overlay on top of the map indicating, for a selected product, whether people like or dislike a product. The locations on the map may be selected based on the address of the user who uploaded the image. By selectively activating and de-activating camera 112 of the client device for use with application 111 to cause images to be uploaded, the integrity of the data of physical object metadata database 337 is preserved in a manner that guarantees the accuracy of the location data when producing such a map or similar user interface. Physical object provider 130 may refine selections made by physical object selection module 332 on the basis of the data of physical object metadata database 337.

Image database 338 stores the images in connection with their individual metadata. The images may be retrieved for browsing by a given application 111 of a given client device. Social graph 339 maintains connections between the user and other users. Social graph 339 may be stored by physical object provider 130, or may be accessed from a third-party service.

Exemplary User Interfaces and Data Flows

Exemplary user interfaces and data flows are provided herewith in Appendices A and B. Appendix A includes a sequence of user interfaces that may be displayed within application 111, starting with user interfaces for ordering and receiving ordered physical objects (e.g., clothing), and ending with user interfaces for finalizing which physical objects to keep, and which to return. The sequence is generally self-explanatory; however, it bears emphasis that, as explained above, camera 112 is not active for use until the physical objects are delivered (e.g., the "Your Flip Box has arrived" user interface is active), and camera 112 may be de-activated for use with application 111 when items are indicated for return (e.g., just before shipment).

Appendix B includes a sequence of user interfaces that may be displayed with application 111 in connection with operating camera 112. Camera 112 may be active when a "Flip Box" is received (e.g., when the physical objects are delivered). A picture may be taken (e.g., a user may take a selfie using camera 112 by way of application 111). The user may select which physical object(s) that were delivered are featured in a photograph. The user may tag the specific location of each featured object (e.g., causing an icon to appear at that location indicating to a viewer of the photograph that the viewer is supposed to provide feedback on that particular physical object, rather than on the photograph as a whole). The user may zoom in on the photograph to more accurately tag the specific location of a featured object.

Computing Machine Architecture

Figure 4:
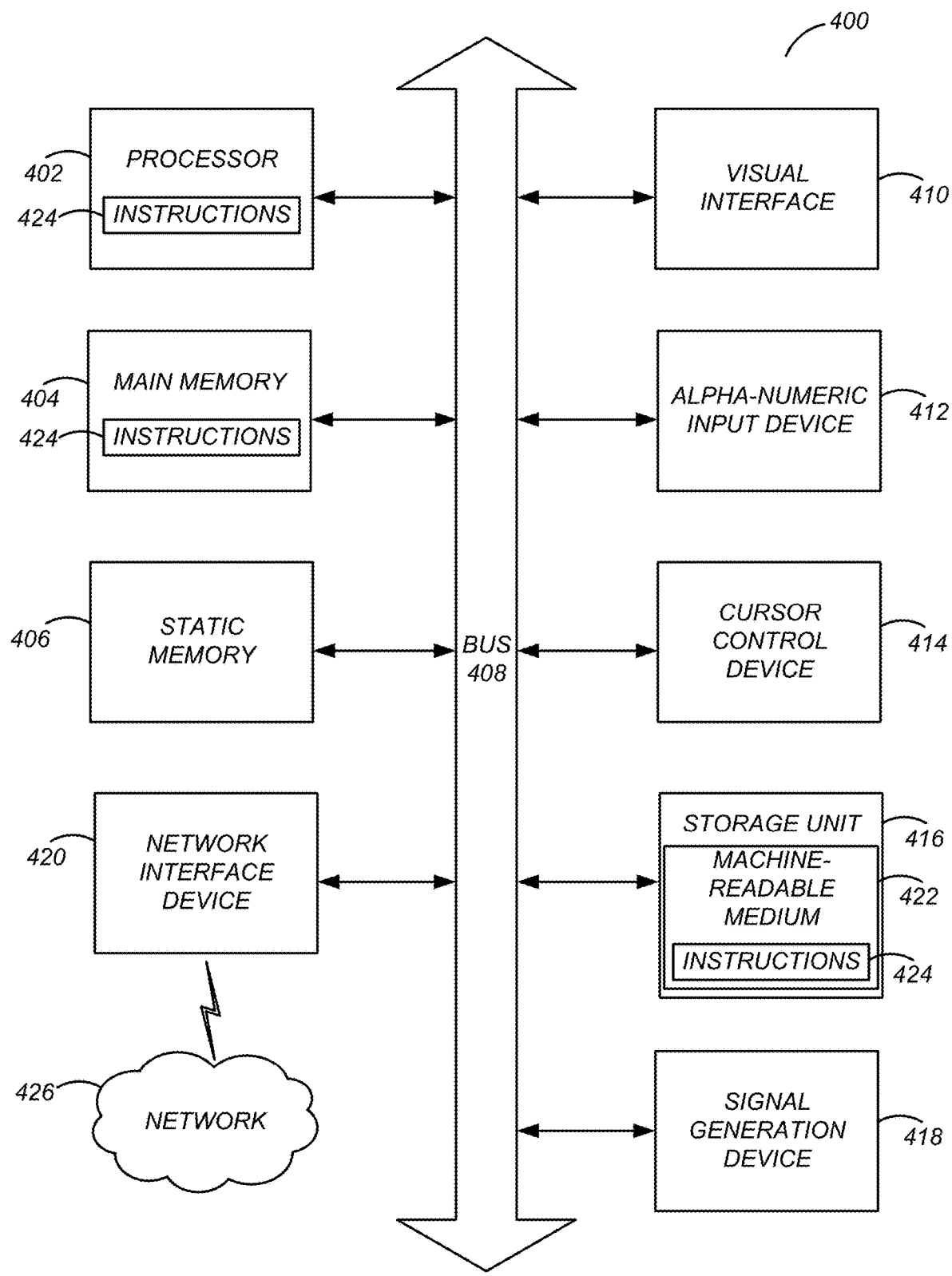
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Camera Activation/De-Activation User Interfaces

Figure 5:
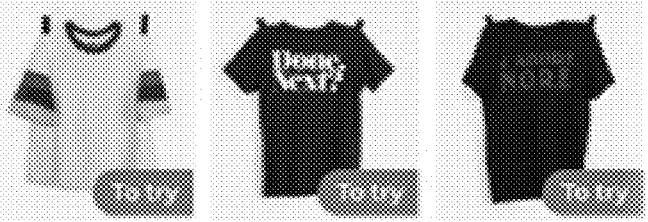
FIG. 5 illustrates one embodiment of an exemplary user interface with an indication that access to the camera by the application is de-activated.

FIG. 5 illustrates one embodiment of an exemplary user interface with an indication that access to the camera by the application is de-activated. User interface 500 depicts a notification to the user that access by application 111 to camera 112 is de-activated. It is indicated that physical objects (in this case, clothes) must actually be received by the user before the user can access camera 112 to share images of the physical objects. User interface 500 may include additional features, such as a selectable option for navigating to an orders page that may provide information about an order or shipment of the physical objects. User interface 500 may be depicted responsive to a user navigating, using application 111, to a tool for using camera 112 to upload images of the user.

Figure 6A:
FIGS. 6A-6B illustrate one embodiment of an exemplary user interface where access to the camera by the application is activated, and tagging is performed.
Figure 6B:
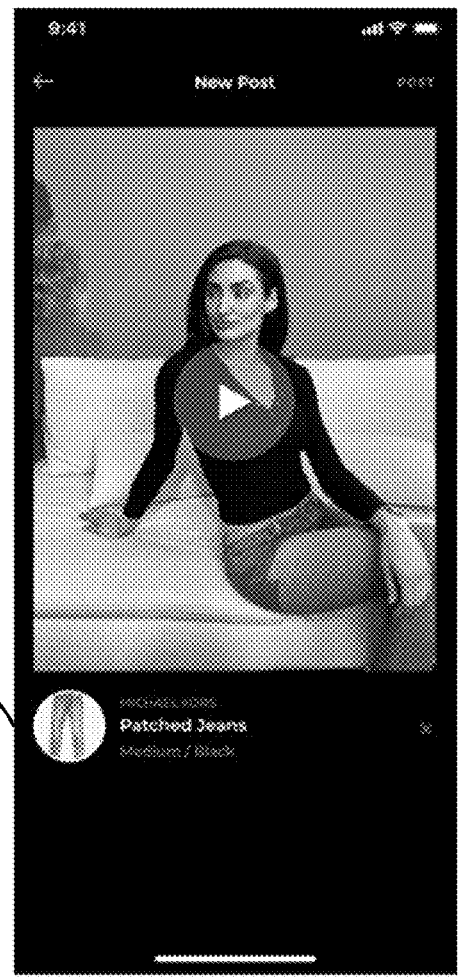

FIGS. 6A-6B illustrate one embodiment of an exemplary user interface where access to the camera by the application is activated, and tagging is performed. Following activation of the camera, the user is enabled to capture a picture of the physical objects—in this case, clothing being worn by the user, as depicted in user interface 600 of FIG. 6A. The user is then able to tag the photo to indicate what, in particular in the image, the user is seeking feedback on. In this case, the user may be seeking feedback on the pants she is wearing, and thus she may add tag 610 by tapping user interface 600, which may cause tag 610 to appear and depict a pair of pants. If the user is seeking feedback on multiple physical objects in the image, the user may add multiple tags, such as a shirt tag.

In an embodiment, the user may drag tag 610 (and any other tag) to a desired location of the image, and may have the image with tag 610 at the desired location published to other users. Alternatively, as depicted in user interface 650 of FIG. 6B, tags may be added by selecting the physical item that was ordered from a list, and having description 660 tagged to the image for publication with the image.

Exemplary Data Flow for Selective Camera Activation

Figure 7:
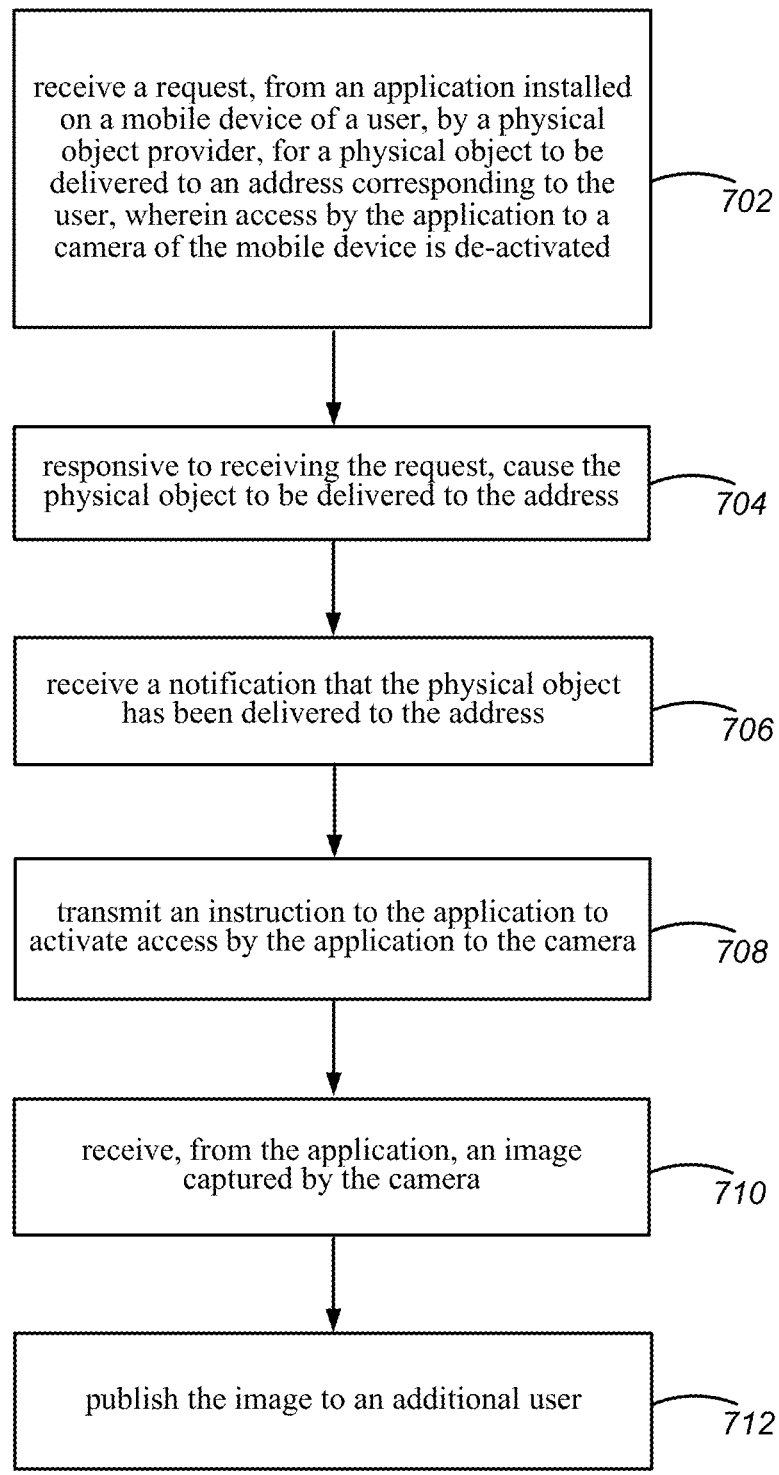
FIG. 7 illustrates one embodiment of an exemplary flow chart for selectively activating access by an application to a camera of a mobile device.

FIG. 7 illustrates one embodiment of an exemplary flow chart for selectively activating access by an application to a camera of a mobile device. Process 700 begins with a processor (e.g., of physical object provider 130) receiving 702 a request, from an application installed on a mobile device of a user (e.g., application 111 of client device 110), for a physical object to be delivered (e.g., by physical object delivery service 140) to an address corresponding to the user. At the time, access by the application to a camera of the mobile device (e.g., camera 112) is de-activated. Responsive to receiving the request, the processor causes 704 the physical object to be delivered to the address (e.g., by transmitting an instruction to physical object delivery service 140 to deliver the physical object to the address of the user).

The processor transmits 708 an instruction to the application to activate access by the application to the camera. For example, after the physical object is in possession of the user, the user is then able to access the camera to upload images of the physical objects. The processor receives 710, from the application, an image captured by the camera (e.g., as depicted in user interfaces 600 and 650), and publishes 712 the image to an additional user (e.g., subject to various verification performed on the image as described herein). Additional processes consistent with the functionality of the modules disclosed herein may be performed (e.g., a de-activation of the camera following a predetermined lapse of time, or following a selection of physical objects to return to physical object provider 130).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for selectively activating and de-activating a camera function of an application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for selectively activating access by an application to a camera, the method comprising:
   receiving a request, from an application installed on a mobile device of a user, by a physical object provider, for a physical object to be delivered to an address corresponding to the user, wherein access by the application to a camera of the mobile device is de-activated;
   responsive to receiving the request, causing the physical object to be delivered to the address;
   receiving a notification that the physical object has been delivered to the address;
   transmitting an instruction to the application to activate access by the application to the camera;
   receiving, from the application, an image captured by the camera; and
   publishing the image to an additional user.

2. The method of claim 1, further comprising:
   accessing profile information including indicia of past interactions of the user with the application that relate to published images that were captured by other users; and
   selecting the physical object based on the profile information.

3. The method of claim 1, wherein access by the application to the camera is de-activated unless an unpurchased physical item remains present at the address.

4. The method of claim 1, wherein the notification is received by way of a dedicated of an application protocol interface established between the physical object provider and a delivery service responsible for delivery of the physical object to the address.

5. The method of claim 1, wherein the application, responsive to the image being captured by the camera, performs the operations of:
   prompting the user to select from a menu of delivered physical objects an object that is within the image; and
   tagging the image with the selected physical object.

6. The method of claim 1, further comprising, responsive to the image being captured by the camera:
   determining whether the image is fraudulent; and
   responsive to determining that the image is fraudulent, transmitting a notification to an administrator.

7. The method of claim 1, further comprising, responsive to the image being captured by the camera:
   determining whether the image includes the physical object; and
   responsive to determining that the image does not include the physical object, causing the application to prompt the user to capture another image that includes the physical object.

8. The method of claim 1, wherein publishing the image to the additional user comprises:
   accessing a social graph that indicates connections between the user and other users; and
   selecting the additional user based on the user being included in a connection between the user and the other users.

9. A non-transitory computer-readable medium comprising memory with instructions encoded thereon for selectively activating access by an application to a camera, the instructions causing one or more processors to perform operations when executed, the instructions comprising instructions to:
   receive a request, from an application installed on a mobile device of a user, by a physical object provider, for a physical object to be delivered to an address corresponding to the user, wherein access by the application to a camera of the mobile device is de-activated;
   responsive to receiving the request, cause the physical object to be delivered to the address;
   receive a notification that the physical object has been delivered to the address;
   transmit an instruction to the application to activate access by the application to the camera;
   receive, from the application, an image captured by the camera; and
   publish the image to an additional user.

10. The non-transitory computer-readable medium of claim 9, wherein the instructions further comprise instructions to:
    access profile information including indicia of past interactions of the user with the application that relate to published images that were captured by other users; and
    select the physical object based on the profile information.

11. The non-transitory computer-readable medium of claim 9, wherein access by the application to the camera is de-activated unless an unpurchased physical item remains present at the address.

12. The non-transitory computer-readable medium of claim 9, wherein the notification is received by way of a dedicated of an application protocol interface established between the physical object provider and a delivery service responsible for delivery of the physical object to the address.

13. The non-transitory computer-readable medium of claim 9, wherein the application, responsive to the image being captured by the camera, performs the operations of:
    prompting the user to select from a menu of delivered physical objects an object that is within the image; and
    tagging the image with the selected physical object.

14. The non-transitory computer-readable medium of claim 9, wherein the instructions further comprise instructions to, responsive to the image being captured by the camera:
    determine whether the image is fraudulent; and
    responsive to determining that the image is fraudulent, transmit a notification to an administrator.

15. The non-transitory computer-readable medium of claim 9, wherein the instructions further comprise instructions to, responsive to the image being captured by the camera:
    determine whether the image includes the physical object; and
    responsive to determining that the image does not include the physical object, cause the application to prompt the user to capture another image that includes the physical object.

16. The non-transitory computer-readable medium of claim 9, wherein the instructions to publish the image to the additional user comprise instructions to:
    access a social graph that indicates connections between the user and other users; and
    select the additional user based on the user being included in a connection between the user and the other users.

17. A system for selectively activating access by an application to a camera, the system comprising:
    memory with instructions encoded thereon; and one or more processors that, when executing the instructions, are caused to perform operations comprising:
- receiving a request, from an application installed on a mobile device of a user, by a physical object provider, for a physical object to be delivered to an address corresponding to the user, wherein access by the application to a camera of the mobile device is de-activated;
- responsive to receiving the request, causing the physical object to be delivered to the address;
- receiving a notification that the physical object has been delivered to the address;
- transmitting an instruction to the application to activate access by the application to the camera;
- receiving, from the application, an image captured by the camera; and
- publishing the image to an additional user.

18. The system of claim 17, wherein the operations further comprise:
- accessing profile information including indicia of past interactions of the user with the application that relate to published images that were captured by other users; and
- selecting the physical object based on the profile information.

19. The system of claim 17, wherein access by the application to the camera is de-activated unless an unpurchased physical item remains present at the address.

20. The system of claim 17, wherein the notification is received by way of a dedicated of an application protocol interface established between the physical object provider and a delivery service responsible for delivery of the physical object to the address.

* * * * *

UNITED STATES PATENT AND TRADEMARK OFFICE
CERTIFICATE OF CORRECTION

| | |
|---|---|
| PATENT NO. | : 11,412,382 B2 |
| APPLICATION NO. | : 16/742667 |
| DATED | : August 9, 2022 |
| INVENTOR(S) | : Nooruldeen A Arif Alaarif |

It is certified that error appears in the above-identified patent and that said Letters Patent is hereby corrected as shown below:

In the Claims

In Column 13, Claim 4, Line 35, delete "dedicated of an application" and insert -- dedicated application --, therefor.

In Column 14, Claim 12, Line 32, delete "dedicated of an application" and insert -- dedicated application --, therefor.

In Column 16, Claim 20, Line 13, delete "dedicated of an application" and insert -- dedicated application --, therefor.

Signed and Sealed this
Eighteenth Day of October, 2022

Katherine Kelly Vidal
*Director of the United States Patent and Trademark Office*